US010785181B2

(12) United States Patent
Dhariwal et al.

(10) Patent No.: US 10,785,181 B2
(45) Date of Patent: Sep. 22, 2020

(54) SHARING CONTENT TO MULTIPLE PUBLIC AND PRIVATE TARGETS IN A SOCIAL NETWORK

(71) Applicant: Microsoft Technology Licensing, LLC, Redmond, WA (US)

(72) Inventors: Arpit Dhariwal, San Francisco, CA (US); Christopher Szeto, Mountain View, CA (US); Qianru Zhang, Fremont, CA (US); Jesse Jyh-Cherng Hsia, Santa Clara, CA (US); Birjodh Tiwana, Lafayette, CA (US); Haiyang Liu, Redwood City, CA (US); Kurt Mcculloch, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 149 days.

(21) Appl. No.: 15/847,304

(22) Filed: Dec. 19, 2017

(65) Prior Publication Data

US 2019/0190875 A1 Jun. 20, 2019

(51) Int. Cl.
*H04L 12/58* (2006.01)
*G06N 20/00* (2019.01)
*G06F 16/951* (2019.01)

(52) U.S. Cl.
CPC ............ *H04L 51/32* (2013.01); *G06F 16/951* (2019.01); *G06N 20/00* (2019.01); *H04L 51/046* (2013.01)

(58) Field of Classification Search
CPC ........ H04L 51/32; G06F 16/951; G06N 20/00
See application file for complete search history.

(56) References Cited

U.S. PATENT DOCUMENTS

| 2011/0196935 | A1* | 8/2011 | Rideout | .................. H04W 4/21 709/206 |
| 2013/0318180 | A1* | 11/2013 | Amin | ................. G06Q 30/0251 709/206 |
| 2017/0126592 | A1* | 5/2017 | El Ghoul | ................ H04L 51/04 |
| 2019/0102396 | A1* | 4/2019 | Pan | ........................... G06F 7/08 |

\* cited by examiner

*Primary Examiner* — Caroline H Jahnige
(74) *Attorney, Agent, or Firm* — Schwegman Lundberg & Woessner, P.A.

(57) ABSTRACT

Described herein is a technique to facilitate the sharing of a content item presented in a content feed of a social networking service. Upon detecting that a member has selected an option to share a content item, a content sharing interface is presented. The content sharing interface includes options share the content item publically via a content feed, and privately via a messaging service. The content sharing interface provides a ranked list of recommended recipients, where the recommended recipients in the list are selected and ordered based on several factors, including factors relating to the relationship between the sharing member and the recommended recipients, as well as factors relating to the subject matter of the content item and the likelihood that a recommended recipient would be interested in the content item.

14 Claims, 9 Drawing Sheets

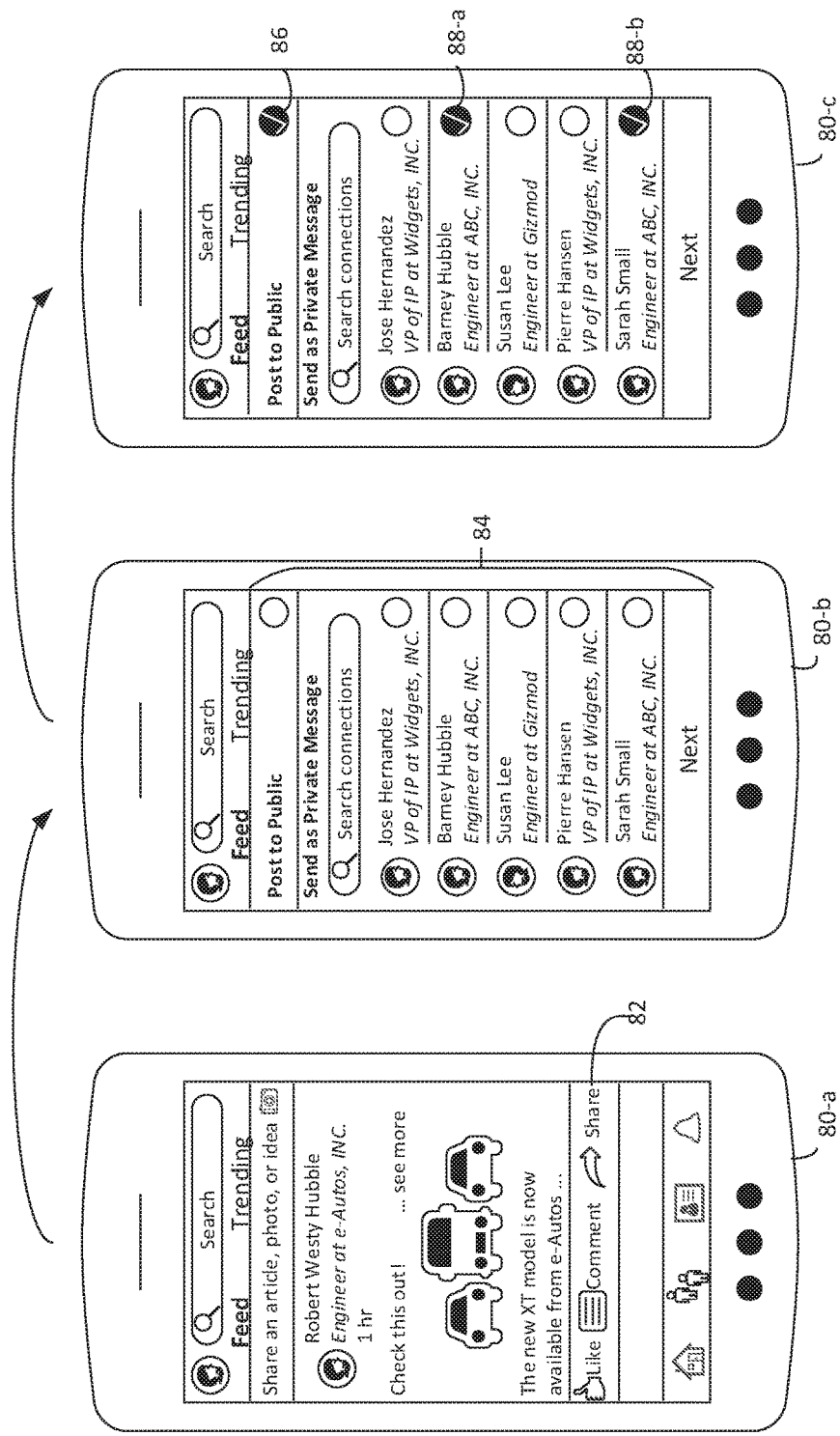
FIGURE 6-A

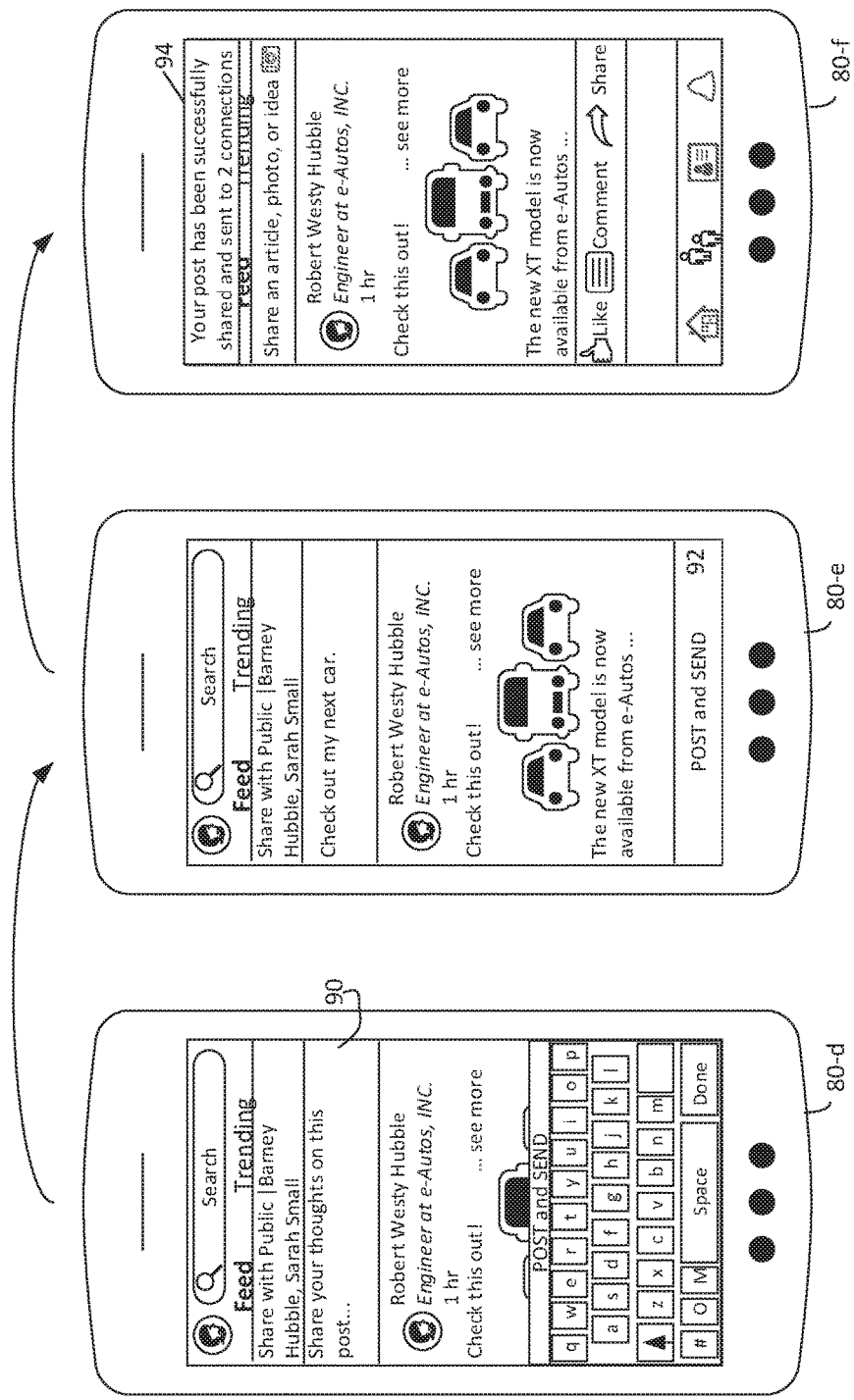
FIGURE 6-B

SHARING CONTENT TO MULTIPLE PUBLIC AND PRIVATE TARGETS IN A SOCIAL NETWORK

TECHNICAL FIELD

The subject matter disclosed herein generally relates to data processing systems and computer-based, user interfaces for social networking and content publishing services, and more specifically, to computer program products, methods and systems that facilitate the presentation and sharing of content in a content feed of a social networking service.

BACKGROUND

A social networking service is a type of online platform that people use to memorialize their social relations and share content, with others. While an exact definition for a social networking service may be elusive, social networking services generally tend to share a variety of technical features that allow individuals to construct a public or semi-public member profile, identify other members with whom they are associated or share a "connection" (e.g., friends, co-workers, relatives, etc.), and view a list of those other members with whom they are formerly associated or connected via the social networking service. Some social networking services support the concept of bilateral connections, where each member in a member-to-member connection pair is prompted to accept or verify the authenticity of the connection. For example, if member A identifies member B as a friend, member B must confirm or verify the existence of the relationship before it is formally recognized by the social networking service. In other social networking services, unilateral connections are supported, such that one member may "follow" another member without explicit consent from the member being followed. Of course, some social networking services support both unilateral and bilateral connections.

Many social networking services provide one or more mechanisms by which members can share content and/or communicate with other members. For example, many social networking services provide a chat or messaging service that allows members to communicate directly with other members by sending messages, links, photos, videos, files, and so forth. With some social networking services, the chat or messaging service may, in some instances, limit the members to whom another member can directly communicate, such that a member is only allowed to directly message another member with whom the member has first established a formal connection via the social networking service. Accordingly, with many social networking services, the connections established between members serve as an access privilege for purposes of communicating and sharing with others, as well as viewing content of others.

Another one of the more common communication mechanisms in use with many popular social networking services is a content feed, sometimes referred to as a feed, data feed, news feed, activity stream, content stream, or update stream. As used by many social networking services, a content feed is a mechanism by which members publish, share and/or view content items (e.g., stories, news articles, photos, videos, files, status updates, and so forth). Additionally, with some content feeds, one or more applications or services may publish content items to the content feed, for example, relating to various activities of members. Whereas a chat or messaging service is generally a good way to communicate one-to-one, or one-to-a-few, a content feed provides a way to communicate and share content with a much larger audience. For example, when posting a content item to a content feed, a member may designate the target audience as "public" (e.g., all members of the social networking service). Alternatively, the member may designate a target audience as a self-organized group, or some other subset of members, such as all first-degree connections of the member, or, all first- and second-degree connections of a member, and so forth.

With many social networking services, the content feed is an extremely important driver of user engagement generally, and public conversations specifically. As such, any friction associated with content sharing serves to unnecessarily limit overall engagement. For instance, the more difficult it is to generate and share content, the more likely it is that users will forego sharing content, specifically, and using the service, generally.

BRIEF DESCRIPTION OF THE DRAWINGS

Embodiments of the present invention are illustrated by way of example and not limitation in the figures of the accompanying drawings, in which:

FIGS. 6A and 6B are user interface diagrams illustrating various user interfaces that are part of a content sharing flow, consistent with various embodiments of the present invention;

DETAILED DESCRIPTION

Described herein are methods, systems and computer program products to facilitate the sharing of content via a social networking service such that content items published in a content feed can quickly and easily be shared both publically, via the content feed, and privately, via a messaging or chat service. In the following description, for purposes of explanation, numerous specific details are set forth in order to provide a thorough understanding of the various aspects of different embodiments of the present invention. It will be evident, however, to one skilled in the art, that the present invention may be practiced without all of these specific details.

Many social networking services provide the ability for members to post or publish content to a content feed. Consistent with a typical content feed of a social networking service, a member interacts with a content publishing interface to author a content item, and then publishes or posts the content item to the content feed. Via the content publishing interface, the member may identify a news article, a photo, a video, or some other content hosted at a third-party site, e.g., by referencing a link associated with the news article or content. Additionally, the member may specify a target audience to receive the content item. For example, the member may publish the content item to the public (e.g., all members of the social networking service), or some subset of members, such as the member's connections (or, friends). The published content item will then appear in the content feed of those members targeted by the member who has published or posted the content item.

Figure 1:
FIG. 1 is a user interface diagram showing an example content feed of a social networking service, including a content sharing interface consistent with conventional sharing techniques.

When a member is viewing his or her content feed, each content item shown in the content feed may be presented with one or more selectable buttons or icons, providing the member with the ability to interact with the content. By way of example, FIG. 1 is a user interface diagram showing an example content feed 10 of a social networking service. As shown in the example content feed 10 of FIG. 1, the content item 12 that has been "liked" by Fred Flint is shown with three separate buttons or icons that the viewing member can select. A first button, labeled "Like" 14, provides the member with the ability to express that he or she likes, enjoys, or supports the content item 12. A second button, labeled "Comment" 16, provides the member with the ability to add a comment to the content item 12. A third button, labeled "Share" 18, provides the member with the ability to share the existing content item 12 with others, adding his or her own commentary about the content item 12, prior to sharing.

Referring to the example content item 12 of FIG. 1, upon selecting the "Share" button 18, a content sharing interface 20 is presented to the member. In this conventional content sharing interface 20, the member is provided with various independently-selectable options (e.g., each option is mutually exclusive). For example, by selecting the "Share (Public)" option from the content sharing interface 20, the member can share the content item 12 publically—that is, with all members of the social networking service—via the content feed. Alternatively, by selecting the "Share Post (Friends)" option from the content sharing interface 20, the member can share the content item 12 via the content feed with his or her friends (e.g., connections) as memorialized by the social networking service. Accordingly, the content item 12 will appear in the personalized content feeds of those members with whom the sharing member is connected. Another option presented in the content sharing interface 20, "Send as Message." allows the viewing member to share the content item 12 with one or more other members privately, for example, via a messaging service. Upon selecting this option, the sharing member is generally presented with a second user interface (not shown) via which the sharing member must identify or designate one or more individual members with whom to share the content item 12.

The example content feed 10 of FIG. 1 is illustrative of two specific problems that exist with conventional content sharing techniques and user interfaces. First, as each option in the content sharing interface 20 is independently selectable (mutually exclusive), there is no quick and easy way to share with more than one of the target audiences represented by the several independently-selectable options. For example, there is no quick and easy way to share with a public audience, e.g., via the content feed, AND a private target audience, e.g., via a private message. Selecting "Share (Public)" from the content sharing interface 20 will result in the content item being shared publically. To share with one or more individual members privately, the viewing member would need to select the "Share" button 18 a second time, and then navigate a second content sharing interface, as part of the content sharing flow, for selecting or otherwise identifying the individual members with whom the content is to be shared. Furthermore, for each separate target audience selected, the sharing member would have to provide his or her commentary separately. Accordingly, the sharing member may have to enter his or her commentary multiple times, once for each separate target audience. On a mobile computing device with a tiny touchscreen keyboard, providing textual input can be both time consuming and error prone. Having to enter it twice only exacerbates these problems.

Additionally, when a member elects to share a content item with one or more individual members privately, whether it be via the content feed or private message, the member may have an extremely difficult time identifying and selecting the individual members with whom the content item is to be shared. For instance, with conventional content sharing interfaces, the user interface may simply prompt the sharing member to enter one or more names, or select from a large list of that member's friends or connections. Given that any individual member may have hundreds, if not thousands, of friends or connections, identifying and selecting the names of those members who may be the most appropriate recipients of the content item becomes a difficult and time-consuming task.

Consistent with embodiments of the present invention, when a member of a social networking service chooses to share a content item, the member is presented with a content sharing interface that is personalized for the member, based at least in part on that member's connections and the content item itself, providing for both public and private sharing of the content item. For example, via a single content sharing interface, a member may select an option to share the content item publically via a content feed, and select one or more options for sharing the content item, privately, with individual members of the social networking service, for example, via a messaging or chat service. With some embodiments, the member may also be able to select an option to share the content item with one or more semi-private target audiences (e.g., self-organized groups or communities). In yet other embodiments, an option to share the content item with all employees of a company, or, all employees of a company having a particular job title, may be presented.

With some embodiments, the content sharing interface identifies individual members of the social networking service as recommended recipients of the content item. The recommended recipients are algorithmically determined, based on a variety of factors. Accordingly, a member who desires to share a content item can simultaneously share a content item via the content feed with one or more large groups, and one or more individual members of the social networking service via a private messaging or chat service.

Consistent with some embodiments, some or all of the recommended recipients (e.g., target audiences) that are presented in the content sharing interface for selection by the sharing member are algorithmically determined based on data-driven algorithms that take into consideration a variety of factors. For example, for a particular member desiring to share a particular content item presented in the content feed, the list of individual members presented as recommended recipients may be determined and then presented to the sharing member based on a variety of factors, including factors relating to the relationship between the sharing member and a recommended recipient, and factors relating to the interest of a recommended recipient in the subject matter of the content item being shared. As such, consistent with embodiments of the invention, the content sharing interface is dynamically generated and personalized for the sharing member, as opposed to a conventional content sharing interface (such as that presented in FIG. 1) that is static in nature, showing the exact same sharing options for all members, regardless of who is sharing the content item, and independent of the nature of the content item being shared. Other aspects and advantages of the present inventive subject matter will be readily apparent from the detailed description of the several figures that follows.

Figure 2:
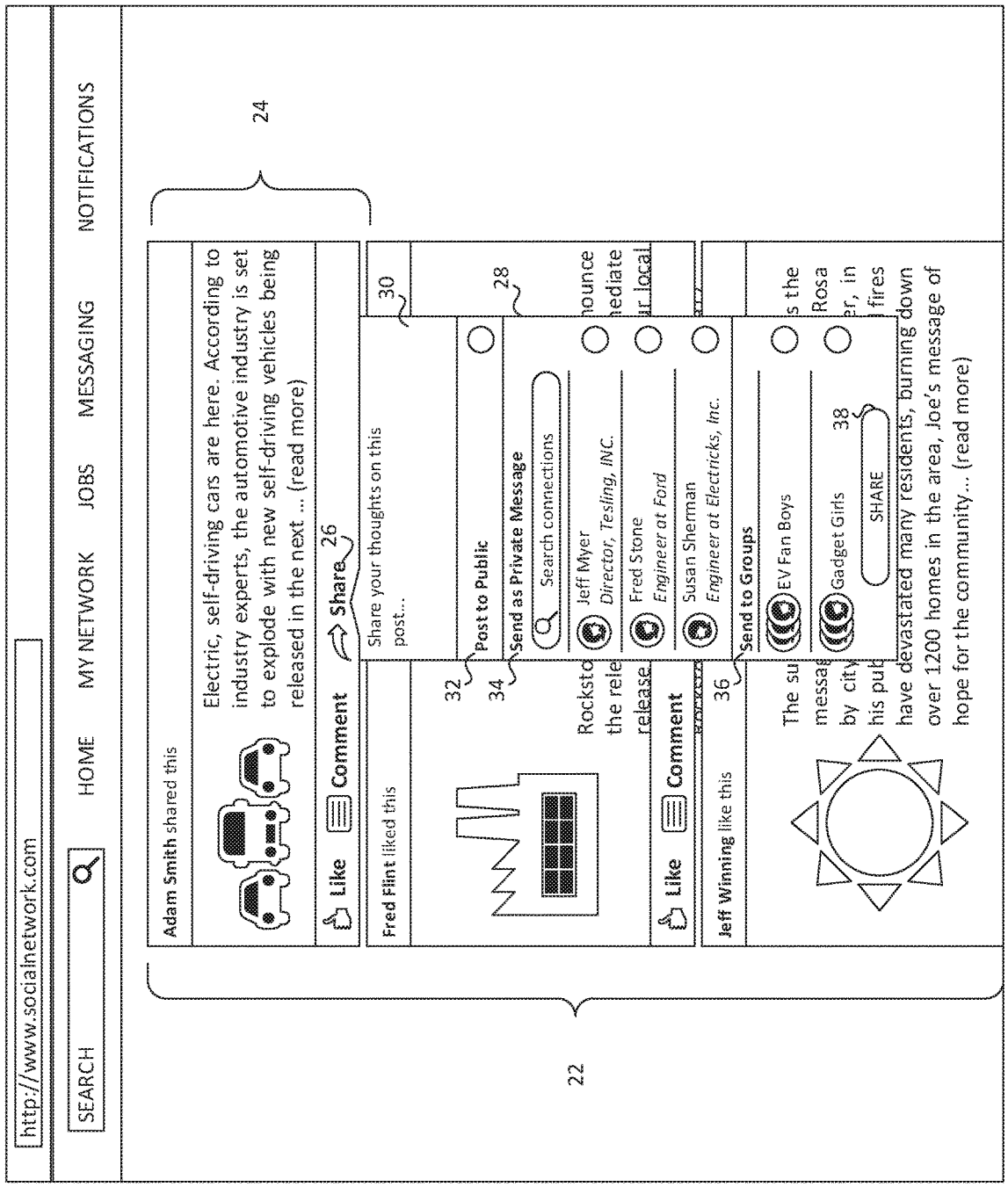
FIG. 2 is a user interface diagram showing an example of a content feed of a social networking service, including a content sharing interface consistent with embodiments of the present invention.

With reference to the example user interface diagram of FIG. 2, an example content feed 22 for a social networking service is shown. In this example, a member has selected the "Share" button 26 that has been presented with the top content item 24 in the content feed 22. Consistent with embodiments of the present invention, the content sharing interface 28 is presented as a result of the member selecting the "Share" button 26. As illustrated in the example content sharing interface 28 of FIG. 2, the content sharing interface 28 has a first component 30 prompting a member to provide his or her comments or thoughts about the content item 24 that is being shared. Accordingly, any input provided in the text box 30 will be communicated with the content item (as shared by the member), whether it be in the content feed or via messaging service. In addition, the sharing member is presented with several options for recommended recipients (e.g., target audiences) with whom to share the content item 24, including a first option 32 to share the content item 24 with the public (e.g. "Post to Public"). A second set of recommended recipients 34, representing individual members with whom the content item might be shared, are also presented. Finally, a third set of options 36, representing specific groups, are also presented. When sharing to a group, with some embodiments, the content item will be posted to a content feed accessible to all members of the group. In this particular example, the sharing member can make multiple selections of different recommended recipients by simply selecting the circular selection buttons to the right of each recommended recipient (target audience). In this example, after the sharing member makes his or her selections for the target audience, the sharing member simply selects the "SHARE" button 38, and the content item 24 will be shared via the content feed and/or messaging service, depending upon the selections made.

Figure 3:
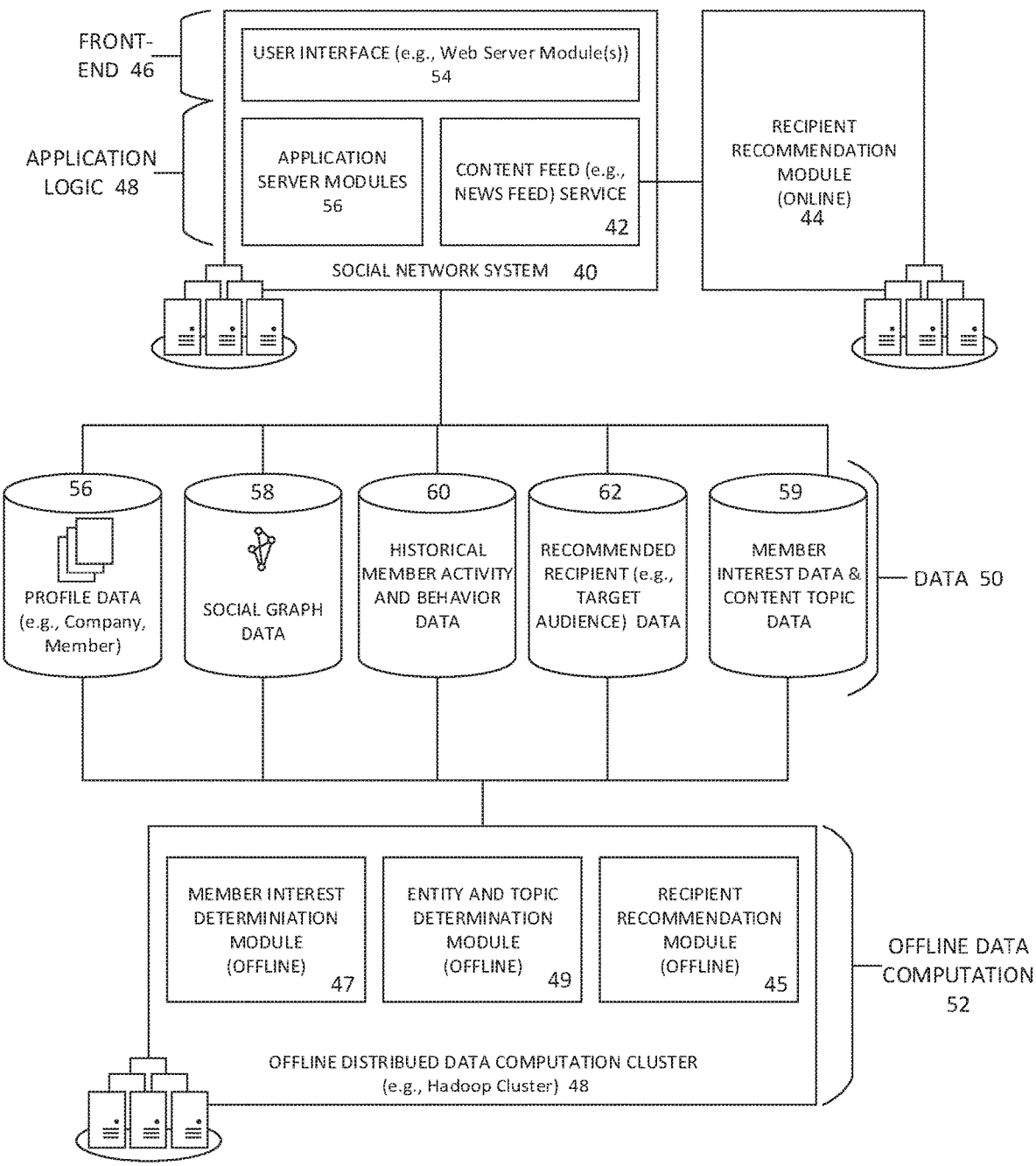
FIG. 3 is a block diagram illustrating various functional components of a social networking service (or, system), with an integrated content feed service via which members can share content items, consistent with some embodiments of the present invention.

FIG. 3 is a block diagram illustrating various components or functional modules of a social networking service or system 40, having an integrated content feed service 42 via wick content items (posts) can be shared, consistent with some embodiments. As shown in FIG. 3, the overall architecture consists of four layers, a front-end layer 46, an application logic layer 48, a data layer 50, and an offline, distributed data computation layer 52. The front-end layer 46 consists of a user interface module (e.g., a web server module) 54, which receives requests from various client-computing devices, and communicates appropriate responses to the requesting client devices. For example, the user interface module(s) 54 may receive requests in the form of Hypertext Transport Protocol (HTTP) requests, or other web-based, application programming interface (API) requests.

The application logic layer 48 includes various application server modules 56, which, in conjunction with the user interface module(s) 54, generate various user interfaces (e.g., web pages) with data retrieved from various services and data sources in the data layer 50. With some embodiments, individual application server modules are used to implement the functionality associated with various services and features of the social networking service. For instance, a job recommendation service may be implemented with an application server module, while a photo sharing application may be implemented with a separate application server module, and so forth. Accordingly, a variety of other applications or services (not shown) that are made available to members of the social networking service will be embodied in their own application server modules.

The data layer 50 consists of several databases storing several different types of data, generally. For example, with some embodiments, the data layer 50 includes databases for storing profile data 56 (including member profile and company profile data), social graph data 58, member activity and behavior (e.g., tracking) data 60, and recommended recipient (e.g., target audience) data 62. With some embodiments, one or more databases 59 may also store data identifying the topics with which content items are associated. For example, each content item may be analyzed to determine a set of topics to which that content item relates. Similarly, based on the actions that each member takes, member interest data may be determined and then stored in a database. With some embodiments, this member interest data may be stored as part of a member's profile (e.g., in profile data database 56), or alternatively, in a separate database.

Consistent with some embodiments, when a person initially registers to become a member of the social networking service, the person will be prompted to provide some personal information, such as his or her name, age (e.g., birthdate), interests, contact information (e.g., email address, telephone number), hometown, address, educational background (e.g., schools, majors, matriculation and/or graduation dates, etc.), employment history, skills, professional organizations, and so on. This information is collectively referred to as "member profile data" and is stored, for example, in the database with reference number 56. Similarly, when a representative of an organization initially registers the organization with the social network service, the representative may be prompted to provide certain information about the organization. This information may be stored, for example, in the database with reference number 56, or another database (not shown). With some embodiments, the profile data may be processed (e.g., in the background or offline) to generate various derived profile data. For example, if a member has provided information about various job titles the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Once registered, a member may invite other members, or be invited by other members, to connect via the social networking service. A "connection" may require a bi-lateral agreement by the members, such that both members acknowledge the establishment of the connection. Similarly, with some embodiments, a member may elect to "follow" another member. In contrast to establishing a connection, the concept of "following" another member typically is a uni-lateral operation, and at least with some embodiments, does not require acknowledgement or approval by the member that is being followed. When one member follows another, the member who is following may receive content items or other messages published by the member being followed, or relating to various activities undertaken by the member being followed. Similarly, when a member follows an organization (e.g., a company, or its associated page), the member becomes eligible to receive content items or messages published on behalf of the organization. For instance, content items published on behalf of an organization that a member is following will appear in the member's personalized content feed. In any case, the various associations and relationships that the members establish with other members, or with other entities and objects, are stored and maintained within the social graph, shown in FIG. 3 with reference number 58.

The social networking system 40 may provide a broad range of other applications and services that allow members the opportunity to share and receive information, often customized to the interests of the member. For example, with some embodiments, the social networking service may include a photo sharing application that allows members to upload and share photos with other members. With some embodiments, members may be able to self-organize into groups, or interest groups, organized around a subject matter or topic of interest, with a content feed to share content related to the particular subject matter or topic. With some embodiments, the social networking service may host various job postings providing details of job openings with various organizations.

As illustrated in FIG. 3, the social networking system 40 includes an integrated content feed 42. Generally, a member's content feed is populated with content items that are authored, published or submitted by other members or organizations with whom the member is connected or following, via the social networking service. A member may interact with various content items in the content feed, for example, by viewing or reading the content items. "liking" or up-voting the content items, commenting on the content items, and/or sharing the content items with other members. Such member interactions are sometimes referred to as social gestures, and are generally tracked (e.g., stored) in a database (e.g., database 60 in FIG. 3). As the content items presented in the content feed are associated with various topics, by tracking a member's interactions with the content items, the member's interests in various topics can be inferred by observing the content items with which the member interacts.

With some embodiments, each content item presented via the content feed is analyzed to determine one or more topics to which the content item relates. For example, the topic determination module 49 may use a topic model to analyze and classify content items and identify one or more topics of each content item based on the words and phrases used in the content item. In some instances, the topic of a content item may be inferred based on the member profiles of the members who act on the content item. With some embodiments, the topic determination module 49 will generate for each content item analyzed one or more topic vectors, with each element in a vector representing the magnitude of the likelihood that the content item is associated with a particular topic. The data generated by the topic determination module 49 may be stored in a database, such as database 64 in FIG. 3. Accordingly, a scoring algorithm used by the recipient recommendation module (44 and/or 45) can access the data in database 64, in real-time, or in an offline batch processing mode, as is necessary.

With some embodiments, the entity extraction module 51 identifies entities (e.g., names of people, companies, skills, and so forth) that are used in a content item. As an example, the entity extraction module may first analyze a content item to identify words (e.g., names) that correspond with known entities having a presence in the social networking service. These names, for example, may be the names of members as indicated by member profiles. Because names do not uniquely identify members, the entity extraction module 51 may analyze additional parts of the content item, including the language that is present near the words that represent the name. In this way, the entity extraction module 51 can differentiate entities that are represented by the same name or names. With some embodiments, the entity extraction module 51 is able to generate a probability score for each identified entity. Accordingly, a content item may be determined to be properly associated with a particular entity, only when the probably score exceeds some threshold value. Once again, the data generated by the entity extraction module 51 may be stored in a database, such as database 66 in FIG. 3. Accordingly, a scoring algorithm used by the recipient recommendation module (44 and/or 45) can access the data in database 66, in real-time, or in an offline batch processing mode, as is necessary.

As members interact with the various applications, services and content made available via the social networking service, the members' behavior (e.g., content viewed, searches performed, social gestures, links or member-interest buttons selected, etc.) may be monitored and information concerning the member's activities and behavior may be stored, for example, as indicated in FIG. 3 by the database with reference number 60. In some instances, this data may be used to algorithmically infer an interest or desire of a member, such that the inference can be used in generating a ranked list of recommended recipients to receive a particular content item. By way of example, each time a member performs a particular social gesture with respect to a particular content item, the type of gesture and the content item identifier are stored. Subsequently, on a periodic basis, this information is accessed and analyzed by the member interest determination module 47 to derive data representing the various topics or subject matters of interest to each member. For example, if a member authors, views, likes, comments on, shares, or otherwise interacts with a content item that is determined to be associated with a topic, the information stored for each activity is used by the member interest determination module 47 to generate data representing the topics of interest to the member. With some embodiments, the derived data may be a member interest vector, with each component or element of the vector representing a particular topic (or cluster of topics), and as such, representing the magnitude of that member's interest in the topic (or topic cluster).

Consistent with some embodiments, the social networking service provides a recipient recommendation module or service 44 that receives various parameters as input, and provides, as output, a ranked list of members for populating a recommended recipient list in a content sharing interface. For example, when a member selects a "Share" button associated with a content item presented in the content feed, the recipient recommendation service 44 is invoked to provide a list of recommended recipients for populating a recommended recipient list (e.g., target audience options) in a content sharing interface. The recommended recipient list is personalized for the sharing member based on a context— that is, based on information relating to the content item being presented to the member, and with which the selected "Share" button is associated. The input parameters for the recipient recommendation service 44 include a member identifier, identifying the particular member who is viewing the content item and who will be sharing the content item, as well as a content item identifier, identifying the content item to be shared. The content item identifier is generally associated with the particular content item that the member has requested to share, and in some embodiments may be a uniform resource locator (URL), uniform resource identifier (URI), uniform resource name (URN), or any similar identifier, or uniform resource characteristic (URC). Upon receiving a member identifier and a content item identifier, the recipient recommendation service 44 can identify and rank a set of members for presentation as recommended recipients in a content sharing interface. With some embodiments, the recipient recommendation service 44 may also recommend one or more semi-private target audiences (e.g., self-organized groups) with which to share a particular content item.

By way of example, upon receiving a request for a ranked or ordered set of recommended recipients with Which to populate a recommended recipients list for a particular member who is sharing a particular content item, the recipient recommendation module 44 first identifies a set of candidate recipients for the member identified by the member identifier (input parameter). For instance, with some embodiments, candidate recipients may be limited to the member's first-degree, or, first- and second-degree connections. As such, the recipient recommendation module 44 will utilize data from the member's profile (e.g., profile database 56) and the social graph data (e.g., database 58) to identify members with whom the sharing member is connected. Of course, in other embodiments, there may be no such limitations, such that any member may qualify as a candidate recipient. In yet other embodiments, some coarse scoring method may be used to identify the candidate recipients. Once the candidate recipients are identified or obtained, each candidate recipient is scored using a formula, model or algorithm. For example, with some embodiments, the score for each candidate recipient may be a weighted combination of attributes or features, where the weights (e.g., coefficients) have been "learned" using artificial intelligence, or a machine-learning technique. With some embodiments, multiple formulas or models may be used. For instance, a first formula or model may be used to score candidate recipients for a particular content item that is known to reference a certain type of entity (e.g., a company), and a second formula or model may be used to score candidate recipients for a particular content item associated with one or more topics. In some instances, where multiple formulas or models are used, the resulting separate ranked lists of candidate recipients may be merged to create a final set of recommended recipients for presentation via the content sharing interface.

With some embodiments, the recipient recommendation service 44 may operate in real-time, such that, the recommended recipients for a recommended recipient list are ranked in real-time, responsive to a member selecting the "Share" button associated with a content item. However, in other embodiments, such as that illustrated in FIG. 4, the recommended recipients for a particular member and content item identifier are pre-computed offline, and then simply retrieved from a database in real-time when needed. For instance, turning again to FIG. 3, the recipient recommendation service includes both an online or real-time component—that is, recipient recommendation module (online) 44—and, an offline component—that is, recipient recommendation module (offline) 45.

In this example, for each member, and for each topic in a plurality of topics, a ranked set of recommended contacts is generated offline, via the recipient recommendation module 45. The offline recommendation module 45 executes as part of the offline distributed data computation cluster 49, which is a framework for distributed storage and processing of large datasets. Consistent with some embodiment, the offline distributed data computation cluster 49 may utilize or be based on Apache Hadoop, or some alternative, for example, including but not limited to Apache Spark, Cluster Map Reduce, High Performance Computing Cluster, or Hydra. Further details relating to how a recipient recommendation list is determined for presentation in a content sharing interface are presented below in connection with the description of FIGS. 4 and 5.

Figure 4:
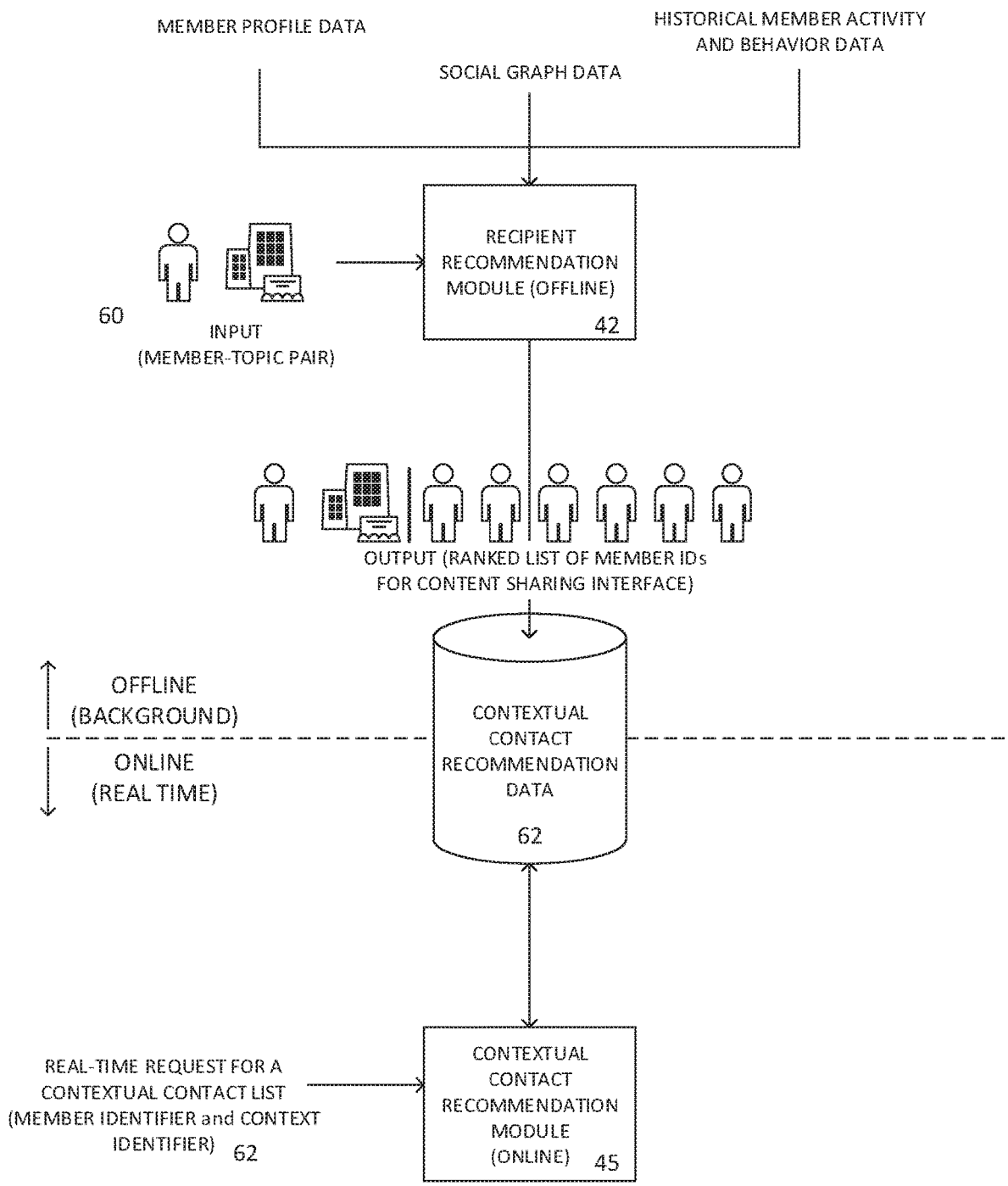
FIG. 4 is a block diagram illustrating the various inputs used by a recipient recommendation service to generate a ranked list of recommended recipients with whom a member might share content, the ranked list for presentation in a content sharing interface, consistent with some embodiments of the present invention.

FIG. 4 is a block diagram illustrating the various inputs used by a recipient recommendation service to generate a ranked list of recommended recipients with whom a member might share content, the ranked list for presentation in a content sharing interface, consistent with some embodiments of the present invention. In this example, for each member in some set of members of a social networking service, for each of several topics, a ranked list of recommended recipients is generated offline, and stored in a database such as that with reference number 62 in FIG. 4). As the recommendations may change over time, with some embodiments, this offline batch computation may be configured to execute on a periodic basis (e.g., every few hours, daily, weekly, etc.).

As shown in FIG. 4, the (offline) recipient recommendation module 45 receives as input at least two parameters, a member identifier, and a content identifier. In this example, the two parameters are presented as a member and content ID pair 60 (e.g., a member identifier and a content identifier). Based on this combination of input parameters, one or more scoring models are selected for scoring a set of candidate recipients. Next, the candidate recipients are selected or identified, generally, using the social graph data and the member profile data. With some embodiments, the candidate recipients may be limited to those other members who are first-degree, or, first- or second-degree connections of the member identified by the member identifier. Alternatively, other techniques may be used to select a set of candidate recipients. For instance, with some embodiments, candidate recipients may be selected based on identifying those members who meet some predefined threshold for some metric of connection strength or connection value.

As described in greater detail in connection with FIG. 5, a connection strength score may be based on the extent to which two members have similarities, based on their member profile attributes. For example, if two members work in the same industry, at the same company, attended the same school, are similar in age, and so forth, their connection strength score will be high. The connection value score may be based on the level of interaction, via the social networking service, between the two members. For example, the connection value score may be dependent upon how recently two members exchanged messages, and how frequently the two members exchange messages, generally.

Next, for each of the selected scoring models and for each candidate recipient, various attributes or features are retrieved for use in a selected scoring model. That is, for each scoring model, a different set or combination of attributes or features may be retrieved and used to score the candidate recipients. For example, depending upon the attributes or features of the selected scoring model, the relevant corresponding member profile data for the candidate recipient, social graph data, and/or activity or behavior data is obtained for use by the scoring model. By way of example, with some embodiments, a first scoring model is used to generate a first pool of candidate recipients who, based on their member profiles, have indicated they have skills related to one or more skills referenced in, or otherwise associated with, a respective content item. A second scoring model may be used to score candidate recipients Who, based on their respective member profiles, are currently or were previously employed with a company that is referenced in the content item, as determined by the entity extraction module 51. Finally, a third scoring model may be used to score candidate recipients who, based on their content viewing habits and/or interactions with content items and the various applications and services of the social networking service, have expressed an interest in one or more topics to which a content item relates. As a result of the scoring the candidate recipients with each of the three scoring models, three pools of candidate recipients are generated. Of course, in other embodiments, where more or fewer scoring models are used, the number of pools of candidate recipients may differ. In any case, after scoring each candidate recipient for a particular member and content identifier pair, and with each scoring model, the ranked list of member identifiers corresponding to the recommended recipients for a given member and content identifier pair, and for a particular scoring model, are written to a database for subsequent consumption by the real-time component of the recommendation service. This general process is simultaneously repeated for some large set of member and topic pairs.

At some subsequent time, a real-time request 62 for a recipient recommendation list is received, where the request specifies at least a member identifier and a content identifier. Accordingly, the (online) recipient recommendation module 45 receives the request, reads from the database 62 the corresponding data records for each pool of candidate recipients, generated with the various scoring models. The real-time recipient recommendation module 45 will then re-score the candidate recipients, as selected from the various pool of candidate recipients, for example, with a scoring model that takes into consideration various features used in measuring relationship strength between the viewing member (i.e., the member who is sharing the content item) and the candidate recipients. Finally, a resulting final ranked list of member identifiers are communicated back to the requesting process, so that the corresponding members can populate the recipient recommendation list presented to the member who is sharing the content item.

With some embodiments, the (online) contextual recommendation module 42 may include a filtering or deduplication function, and/or basic business rules, so as to filter and/or manipulate the results in real-time. Additionally, with some embodiments, while not shown in FIG. 4, the (offline) recipient recommendation module 45 may generate additional output. For example, for each member in the ranked list of members, there may also be information generated that provides an explanation as to why the member is being included in the recipient recommendation list. For example, if a member is employed at a company, and the company is referenced in the content item, the explanation for including that member in a recipient recommendation list may be 1) the member's current employment at the particular company, 2) the member's previous employment at the company, or 3) the member's previous internship at the company. Similarly, if a member has an inferred or explicitly expressed interest in a topic, if the content item is determined to be associated with the topic, this correlation may be expressed as a reason for presenting the member as a recommended recipient. By including this additional information, the member who is viewing the recipient recommendation list is provided with some additional context for understanding why particular members have been included in the recipient recommendation list, and why the particular recommended recipient may have an interest in viewing the content item, if shared.

Although many of the operations have been described in connection with FIG. 4 as occurring offline, consistent with alternative embodiments, some or all of the described operations may occur in real-time. Specifically, the operations may be performed subsequent and responsive to a member requesting a particular user interface. In yet other embodiments, some hybrid may be used, such that some operations occur offline, while others occur online or in real-time, responsive to an end-user's request for a web page or user interface. With some embodiments, for example, a recipient recommendation list may be computed offline for each member-topic pair, while the actual scoring of the candidate recipients occurs in real-time, or, responsive to the end-user making a request to share a content item.

Figure 5:
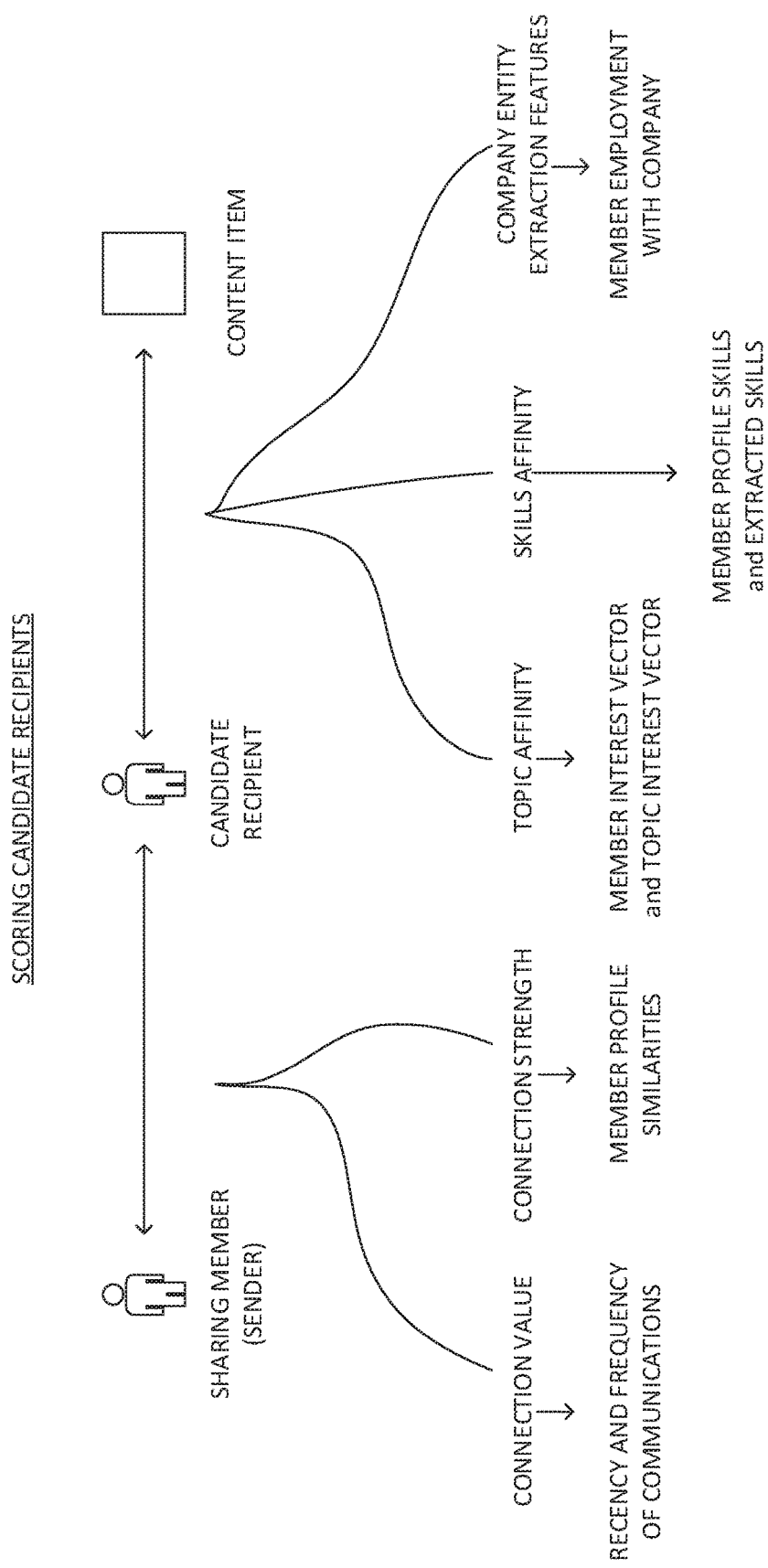
FIG. 5 illustrates examples of the various features that are used with algorithmic method operations that occur to score and rank various members for the purpose of populating a recipient recommendation list, consistent with some embodiments of the present invention.

Turning now to FIG. 5, further details about the various scoring models and their features are provided. It will be readily appreciated by those skilled in the art that the various features illustrated in FIG. 5 might be used in varying combinations, with different weights or coefficients to reflect their respective relevance for a particular scoring model or formula. Furthermore, with some embodiments, the coefficients or weights in use for a particular feature and scoring model may be "learned" with an artificial intelligence or machine-learning approach. For example, consistent with some embodiments, the sharing activity of members over some given period of time may be used as training data in a supervised machine learning context to establish the various coefficients for use with different features in a scoring model.

As illustrated in FIG. 5, generally, there are two types of features used in the scoring models for scoring candidate recipients. A first type of feature, generally used in first pass ranking, relates to the relationship between a candidate recipient and the content item being shared. Similarly, a second set of features generally relates to the relationship strength or connection strength between a viewing or sharing member (i.e., someone viewing and sharing a content item) and a recommended candidate recipient. With some embodiments, the various features may have varying coefficients or weights and may be mixed or combined into a single scoring model. Alternatively, with some embodiments, the various features are used in different scoring models, resulting in multiple pools of candidate recipients during a first pass, and then the final ranked list is generated during a second pass ranking, using features that relate to the connection or relationship strength between the candidate recipients and the viewing member. As a result of the second pass ranking, at least with some embodiments, candidate recipients who are ranked high with one or more scoring models are ultimately selected for the final ranked list. As an example, if a candidate recipient has a strong topic affinity score—meaning the candidate recipient is likely to be interested in the topic of the content item, AND the candidate recipient also has a high skills affinity score, then that candidate recipient is likely to be ranked highly and make the final ranked list.

Referring again to FIG. 5 and by way of example, the company entity extraction features are used to identify candidate recipients, who, based on their member profiles, currently work or have previously worked at a company that is referenced in a content item. If, for example, a candidate recipient's current company matches a company that is referenced in a content item, that candidate recipient will be highly ranked. Similarly, if a candidate recipient was previously employed with a company referenced in a content item, the candidate recipient would rank highly. With some embodiments, current employment will result in a higher score than previous employment. Similarly, the role or job title may impact the score, such that, for example, a candidate recipient who is or was an intern, temporary employee or contract employee, may rank lower than full-time employees.

The skills affinity features are those used to rank candidates based on the candidate recipient having skills, as evidenced by their respective member profiles, that match or correspond with skills referenced in, or otherwise associated with, a content item. With some embodiments, a skills affinity feature is derived in much the same way that the topic affinity feature is derived. For example, a cosine similarity operation may be performed with a first skills vector, representing the skills of a member as specified by his or her member profile, and a second skills vector that includes skills discovered or extracted from the content item. As such, if a member has a skill that is referenced in the content item, the member is more likely to be a recommended recipient to receive the content item, as shared by another member.

A third set of features are related to what is referred to as a topic affinity. With some embodiments, each content item is analyzed to determine the various topics to which it relates. Accordingly, each content item may have a topic vector mapping a set of topics to the content item. Similarly, a member's activity on the social networking service may be tracked to derive a member interest vector. The topic affinity feature may be derived by taking the cosine similarity of these two vectors, resulting in a score between zero and one for each topic (or, for a topic cluster). Accordingly, if a content item relates to a particular topic of interest to a member, that member is more likely to be presented as a recommended recipient of the content item, as shared by another member.

As illustrated in FIG. 5, at least with some embodiments, a first pass ranking is performed, using the aforementioned features; to establish three different pools of candidate recipients. In some embodiments, the first pass ranking may occur offline, and be performed on a periodic basis, such that the three pools of candidate recipients resulting from the processing of the three different scoring models are stored in a database, for subsequent consumption by the first pass ranker, which happens in real time responsive to a request. However, with other embodiments, the first and second pass ranking both occur in real time, in response to a request to populate a content sharing interface with a set of ranked candidate recipients. In either case, during the second pass ranking, the candidate recipients that have already been scored are re-scored, using some different set of features—particularly, features that relate to the strength of relationship between the candidate recipient and the viewing/sharing member. Specifically, with some embodiments, a connection strength between the sharing member and each candidate recipient is considered. A connection strength represents the similarities, based on member profiles, of the sharing member and the candidate recipients. For instance, if two members reside in the same geographical location, went to school at the same university, worked at the same company, and so forth, the connection strength for the member pair would be high, reflecting these member profile similarities. On the other hand, the connection value score reflects the recency and number of interactions that two members have had via the social networking service. For instance, if one member regularly messages another member, comments; likes or re-shares content items posted by the other member, and so forth, then the connection value score for the member pair would be high, reflecting this activity.

In any case, the above features and others can be combined in various ways, and matched with various coefficients (learned or otherwise) to derive scores by which a set of candidate recipients can then be ranked and ordered. The ordered list of candidate recipients will then be presented in a content sharing interface, allowing a member who is sharing a content item to quickly and easily identify and select his or her most well-suited connections to receive the content item.

FIGS. 6A and 6B are user interface diagrams illustrating various user interfaces that are part of a content sharing flow, consistent with various embodiments of the present invention. As illustrated in FIG. 6A, the mobile device 80-*a* initially presents a user interface for a content feed of a social networking application, executing on the mobile device. The content feed includes a content item and a corresponding "Share" button 82. When the member selects the "Share" button 82, a content sharing interface 84 is presented, such as that illustrated in mobile device 80-*b*. Consistent with embodiments of the present invention, the content sharing interface 84 includes options for sharing the content item with the public, via the content feed service, as well as sharing the content item privately with one or more individual members via a messaging service. The individual members that appear in the list of the content sharing interface 84 have been selected and ordered by a recipient recommendation service (e.g., such as the modules 44 and 45 of FIG. 3), based in part on the content item and the relationship information obtained from the various databases in the data layer 50 of FIG. 3.

Referring now to the mobile device with reference number 80-*c*, the sharing member has opted to share the content item with the public, by selecting the option button with reference number 86. In addition, the member has opted to share the content item with two individual members, by selecting the buttons 88-*a* and 88-*b*, associated with members, "Barney Hubble" and "Sarah Small".

In FIG. 6-B, the mobile computing device 80-*d* is shown with a text input box 90 at which the sharing member can enter commentary on the content item being shared. After completing the input of commentary, and selecting the button labeled "Done", the button labeled "POST and SEND" 92 is presented, as shown in the user interface of the mobile computing device with reference number 80-*e*. Finally, after selecting the "POST and SEND" 92 button, the sharing member is presented with a notification 94 indicating that the content item has been shared, for example, vie the content feed, and sent to two connections, for example, via direct messages.

Figure 7:
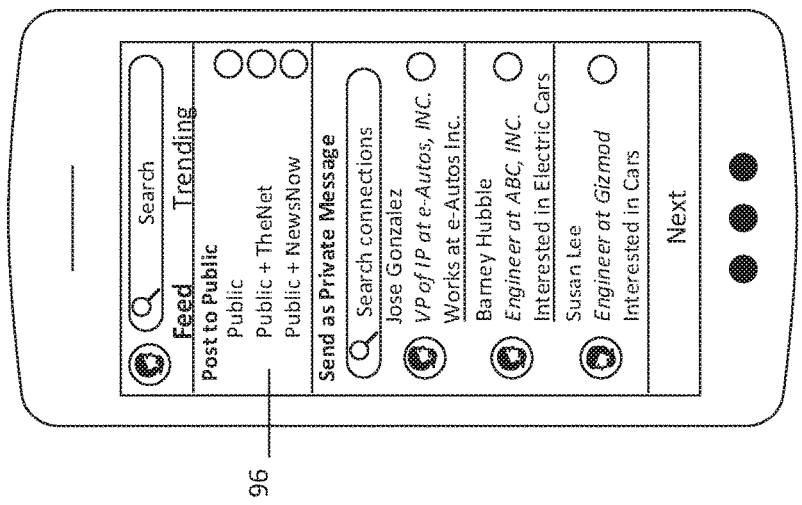
FIG. 7 shows an alternative user interface diagram illustrating different aspects of a user interface for content sharing, consistent with various embodiments of the present invention.

FIG. 7 shows an alternative user interface diagram illustrating different aspects of a user interface for content sharing, consistent with various embodiments of the present invention. In FIG. 7, in addition to providing an option to share a content item with the public, other public options are presented. Specifically, as shown with reference number 96, options to share the content item with the public, via the social networking service, and to an additional, third-party service (e.g., "TheNet") are presented. For instance, with some embodiments, the content sharing interface provides the option to share a content item externally—that is, to a third-party hosted service.

Additionally, as shown in the example user interface of FIG. 7, the text beneath each recommended recipient identifies a reason that the particular recipient has been recommended. For example, Jose Gonzales has been presented as a recommended recipient because Jose "works at eAutos, Inc." and the content item references the company, eAutos, Inc. Similarly, Barney Hubble has been recommended as a recipient because Barney is "Interested in Electric Cars," as shown on the user interface.

Figure 8:
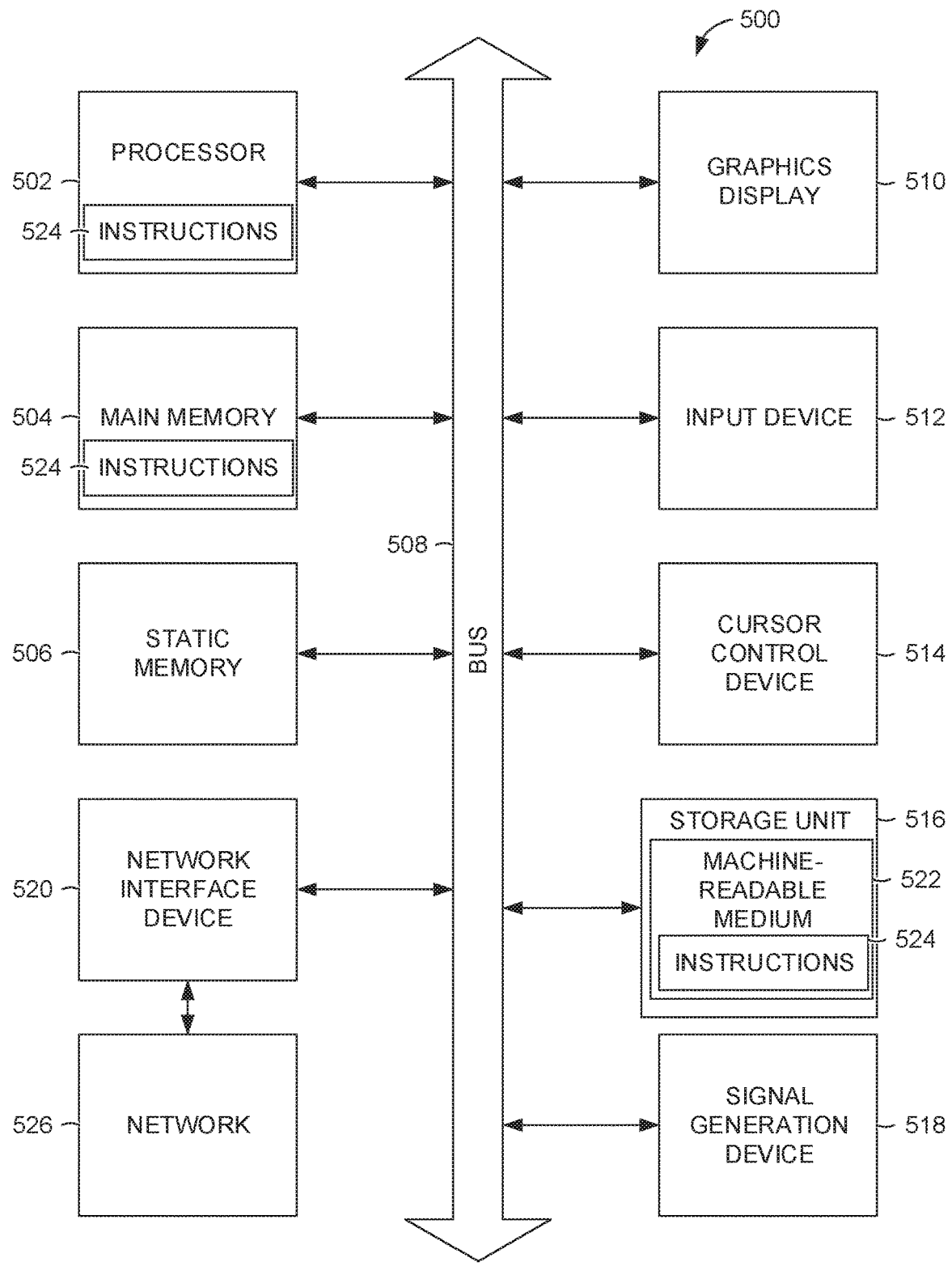
FIG. 8 is a system diagram illustrating an example of a computing device with which, embodiments of the present invention might be implemented.

FIG. 8 is a block diagram illustrating an example of a machine upon which one or more example embodiments may be implemented. In alternative embodiments, the machine (500) may operate as a standalone device or may be connected (e.g., networked) to other machines. In a networked deployment, the machine (500) may operate in the capacity of a server machine, a client machine, or both in server-client network environments. In an example, the machine (500) may act as a peer machine in peer-to-peer (P2P) (or other distributed) network environment. The machine (500) may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine (500) is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating in an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) (500) may include a hardware processor (502) (e.g., a central processing unit (CPU), a graphics processing unit (GPU), a hardware processor core, or any combination thereof), a main memory (504) and a static memory (506), some or all of which may communicate with each other via an interlink (e.g., bus) (508). The machine (500) may further include a display device (510), an alphanumeric input device (512) e.g., a keyboard), and a user interface (UI) navigation device (514) (e.g., a mouse). In an example, the display device (510), input device (512) and UI navigation device (514) may be a touch screen display. The machine (500) may additionally include a mass storage device (e.g., drive unit) (516), a signal generation device (518) (e.g., a speaker), a network interface device (520), and one or more sensors (521), such as a global positioning system (GPS) sensor, compass, accelerometer, or other sensor. The machine (500) may include an output controller (528), such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device (516) may include a machine-readable medium (522) on which is stored one or more sets of data structures or instructions (524) (e.g., software) embodying or utilized by any one or more of the techniques or functions described herein. The instructions (524) may also reside, completely or at least partially, within the main memory (504), within static memory (506), or within the hardware processor (502) during execution thereof by the machine (500). In an example, one or any combination of the hardware processor (502), the main memory (504), the static memory (506), or the storage device (516) may constitute machine-readable media.

While the machine-readable medium (522) is illustrated as a single medium, the term "machine-readable medium" may include a single medium or multiple media (e.g., a centralized or distributed database, and/or associated caches and servers) configured to store the one or more instructions (524).

The term "machine-readable medium" may include any medium that is capable of storing, encoding, or carrying instructions (524) for execution by the machine (500) and that cause the machine (500) to perform any one or more of the techniques of the present disclosure, or that is capable of storing, encoding or carrying data structures used by or associated with such instructions (524). Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions (524) may further be transmitted or received over a communications network (526) using a transmission medium via the network interface device (520) utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device (520) may include one or more physical jacks (e.g., Ethernet, coaxial, or phone jacks) or one or more antennas to connect to the communications network (526). In an example, the network interface device (520) may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions (524) for execution by the machine (500), and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and unless otherwise staled, nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
receiving a request to share a content item presented in a content feed of a social networking service, the request initiated by a first member of the social networking service; and
responsive to receiving the request to share the content item, causing a user interface to be presented, the user interface presenting as non-mutually exclusive options a first option for sharing the content item publicly via a content feed hosted by the social networking service, and a second option for sharing the content item privately, via a messaging service, with one or more separately-selectable individual members of the social networking service, wherein the second option for sharing the content item privately with the one or more separately-selectable individual members of the social networking service includes presenting the names of the individual members as part of an ordered list of names of individual members of the social networking service, the names ordered based on a score assigned to each individual member, the score assigned to each individual member based in part on a topic affinity metric representing a measure of interest in a topic associated with the content item by the respective individual member, as determined from analyzing topics of other content items with which the respective individual member has interacted via the social networking service,
wherein the score assigned to each member is a result of a two-pass ranking algorithm, wherein during a first pass ranking performed offline on a periodic basis, a first score is derived based on features relating to a relationship between a respective member and the content item, and during a second pass ranking performed in real time, a final score is derived based on features relating to a connection strength between the respective member and the first member.

2. The computer-implemented method of claim 1, wherein the score assigned to each member is calculated based on a weighted combination of features with each feature having a co-efficient that is determined with a machine learning technique using data pertaining to historical content items shared by members as a training data set.

3. The computer-implemented method of claim 1, wherein the score assigned to each member appearing in the list of members is based in part on a connection value metric, the connection value metric representing a measure of the recency and/or frequency of communications between the member and a member who initiated the request to share the content item.

4. The computer-implemented method of claim 3, wherein the communications between the member and a member who initiated the request to share the content item include any one or combination of: private messages between members, via a private messaging service; comments made by one member in connection with a content item posted by another member; re-sharing by a member of a content item originally shared by another member; and, upvoting or "liking", by one member, of a content item shared by another member.

5. The computer-implemented method of claim 1, wherein the score assigned to each member appearing in the list of members is based in part on a company entity extraction feature, where the company entity extraction feature positively contributes to the score when a member's member profile indicates that a member is, or has been, employed with a company that is referenced in the content item being shared.

6. The computer-implemented method of claim 1, wherein the user interface includes a text entry box at which the first member of the social networking service is prompted to provide commentary relating to the content item being shared, the commentary to be presented with the content item as presented in a content feed, and as presented via a chat messaging service.

7. The computer-implemented method of claim 1, further comprising:
presenting, with a name of an individual member included in the list, some text indicating a reason that the individual member was selected for inclusion in the list.

8. A system comprising:
at least one processor for executing computer-readable instructions;
a memory storage device storing instructions, which, when executed by the at least one processor, cause the system to perform operations comprising:
receiving a request to share a content item presented in a content feed of a social networking service, the request initiated by a first member of the social networking service; and
responsive to receiving the request to share the content item, causing a user interface to be presented, the user interface presenting as non-mutually exclusive options a first option for sharing the content item publicly via a content feed hosted by the social networking service, and a second option for sharing the content item privately, via a messaging service, with one or more separately-selectable individual members of the social networking service, wherein the second option for sharing the content item privately with the one or more separately-selectable individual members of the social networking service includes presenting the names of the individual members as part of an ordered list of names of individual members of the social networking service, the names ordered based on a score assigned to each individual member, the score assigned to each individual member based in part on a company entity extraction feature, where the company entity extraction feature positively contributes to the score when a member's member profile indicates that a member is, or has been, employed with a company that is referenced in the content item being shared,
wherein the score assigned to each member is a result of a two-pass ranking algorithm, wherein during a first pass ranking performed offline on a periodic basis, a first score is derived based on features relating to a relationship between a respective member and the content item, and during a second pass ranking performed in real time, a final score is derived based on features relating to a connection strength between the respective member and the first member.

9. The system of claim 8, wherein the memory storage device is storing additional instructions, which, when executed, cause the system to perform additional operations, comprising:
calculating the score assigned to each member based on a weighted combination of features with each feature having a co-efficient that is determined with a supervised machine learning technique using data pertaining to historical content items shared by members as a training data set.

10. The system of claim 8, wherein the score assigned to each member appearing in the list of members is based in part on a connection value metric, the connection value metric representing a measure of the recency and/or frequency of communications between the member and a member who initiated the request to share the content item.

11. The system of claim 10, wherein the communications between the member and a member who initiated the request to share the content item include any one or combination of: private messages between members, via a private messaging service; comments made by one member in connection with a content item posted by another member; re-sharing by a member of a content item originally shared by another member; and, upvoting or "liking", by one member, of a content item shared by another member.

12. The system of claim 8, wherein the score assigned to each member appearing in the list of members is based in part on a topic affinity metric, the topic affinity metric representing a measure of interest in a topic associated with the content item by the member, as determined from analyzing topics of other content items with which the member has interacted via the social networking service.

13. The system of claim 8, wherein the user interface includes a text entry box at which the first member of the social networking service is prompted to provide commentary relating to the content item being shared, the commentary to be presented with the content item as presented in a content feed, and as presented via a chat messaging service.

14. The system of claim 8, wherein the memory storage device is storing additional instructions, which, when executed, cause the system to perform additional operations, comprising:
presenting, with a name of an individual member included in the list, some text indicating a reason that the individual member was selected for inclusion in the list.

* * * * *